Feb. 3, 1970  E. G. OTT  3,493,016
WIRE BENDING MACHINE
Filed June 16, 1967  14 Sheets-Sheet 1
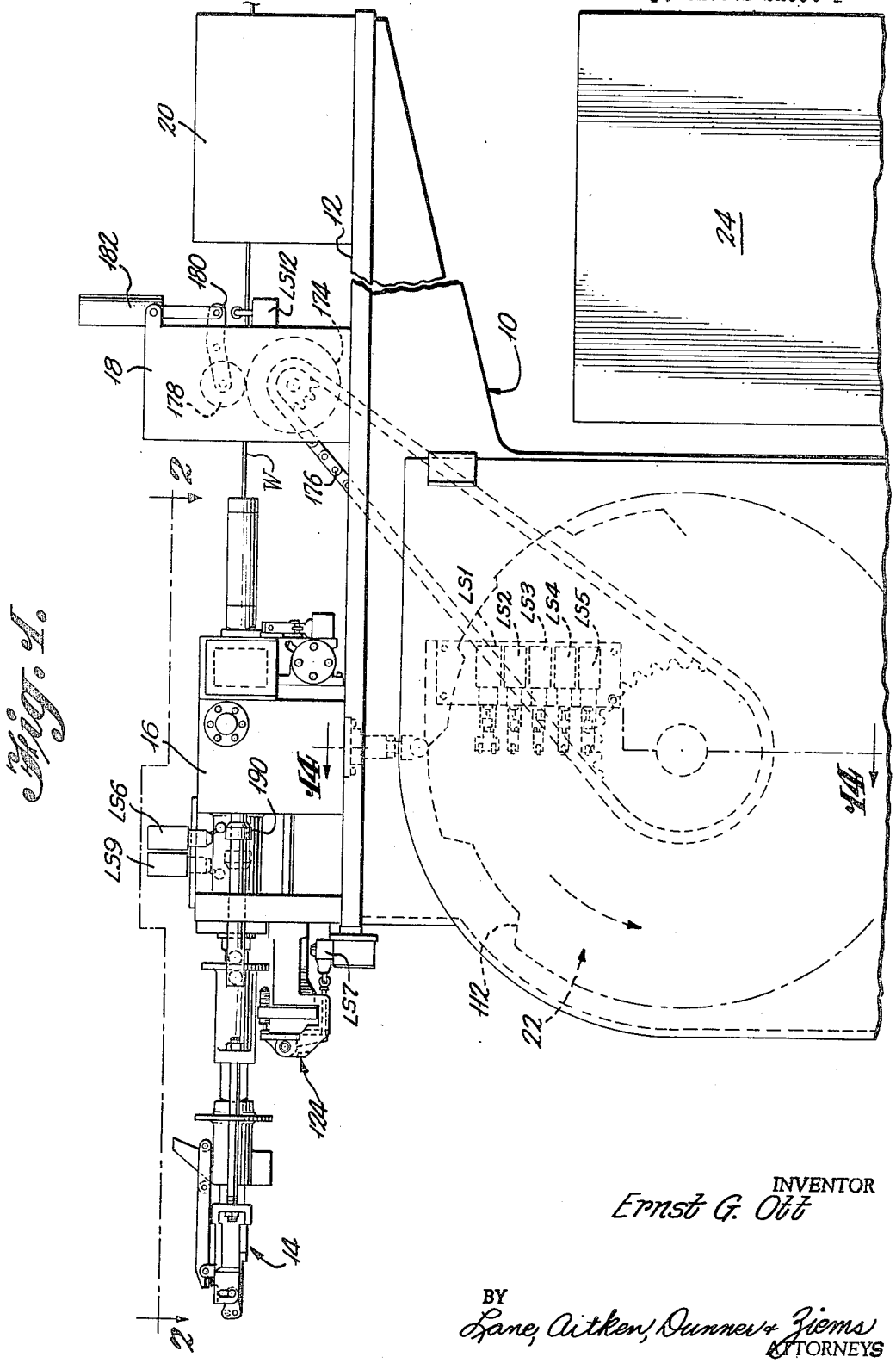
INVENTOR
Ernst G. Ott
BY
Lane, Aitken, Dunner & Ziems
ATTORNEYS Feb. 3, 1970   E. G. OTT   3,493,016
WIRE BENDING MACHINE
Filed June 16, 1967   14 Sheets-Sheet 2
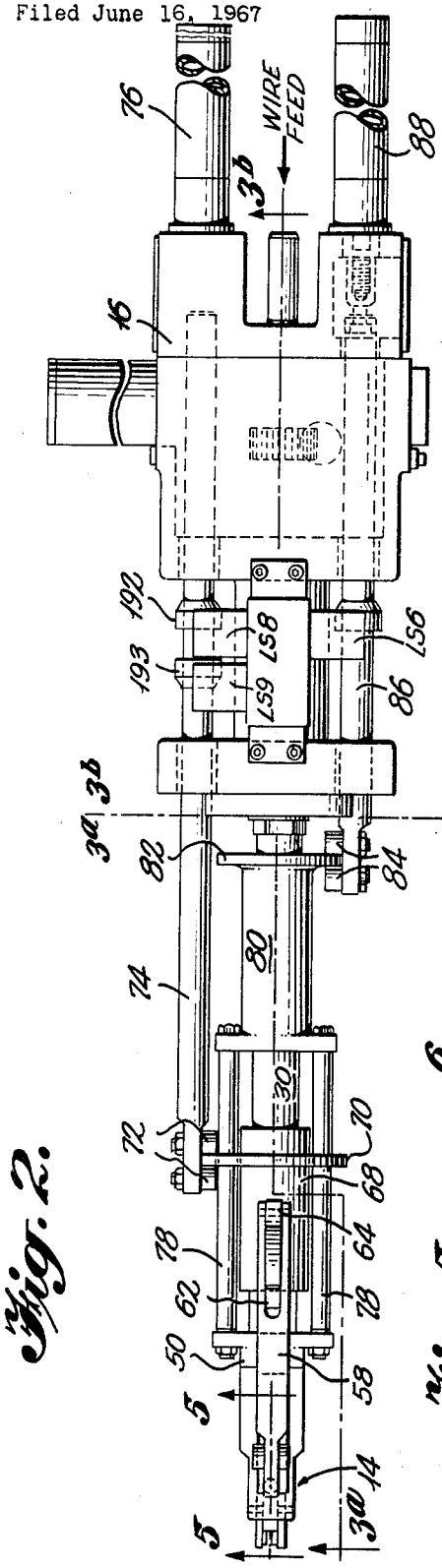
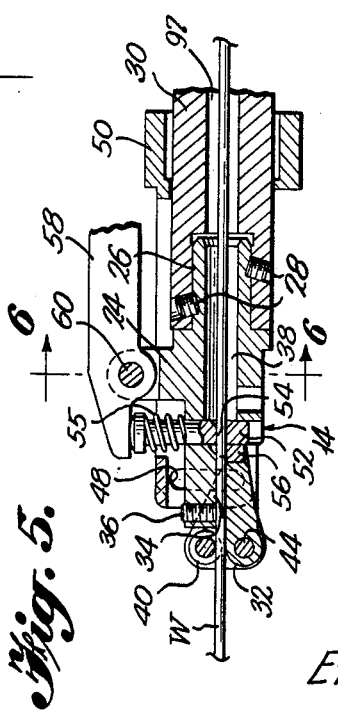
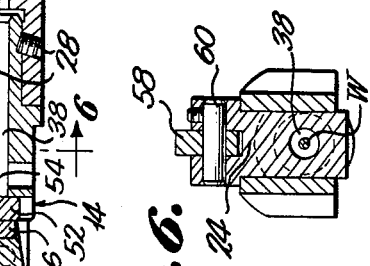
INVENTOR
Ernst G. Ott
BY
Lane, Aitken, Dunner & Ziems
ATTORNEYS

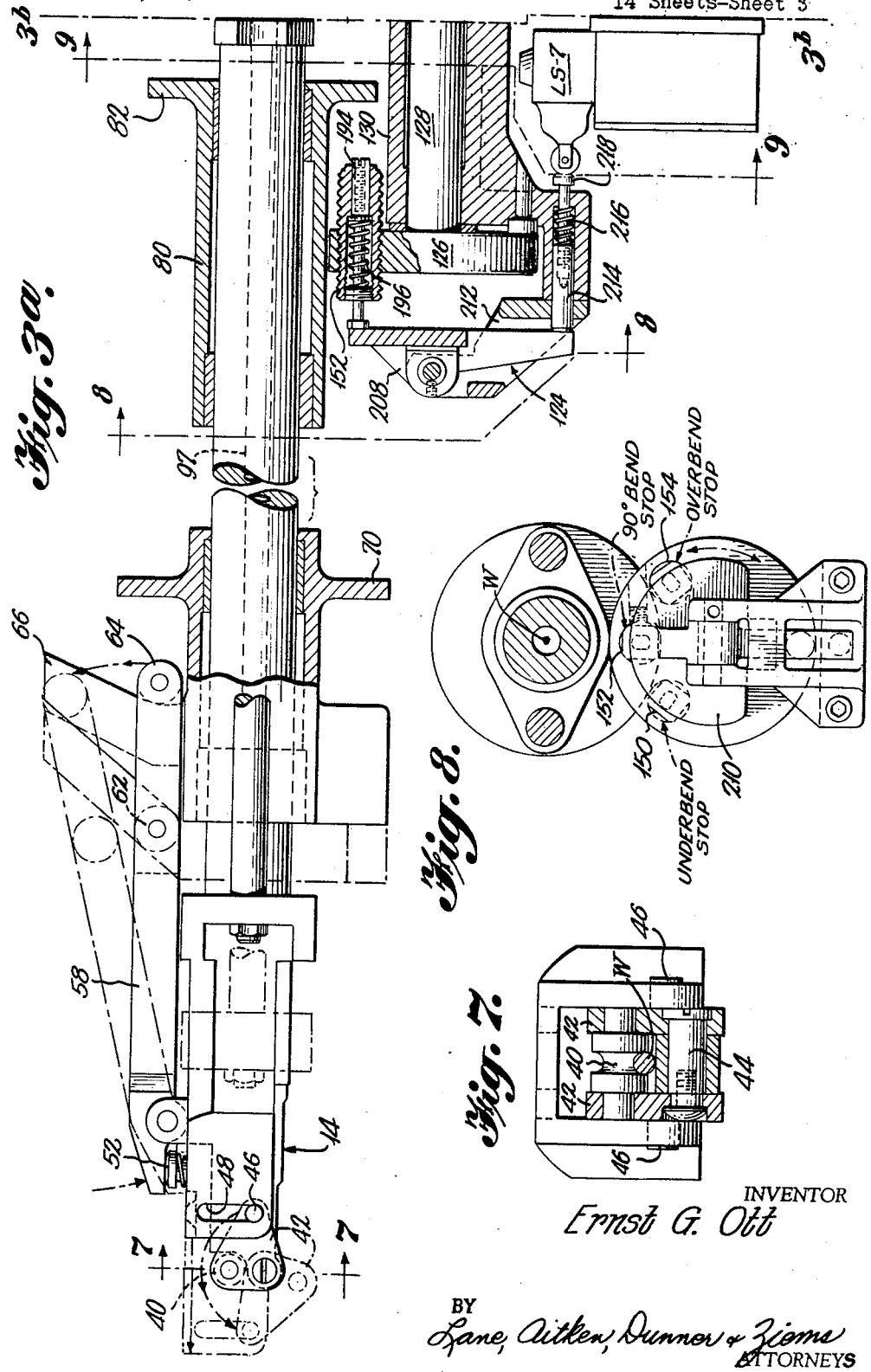

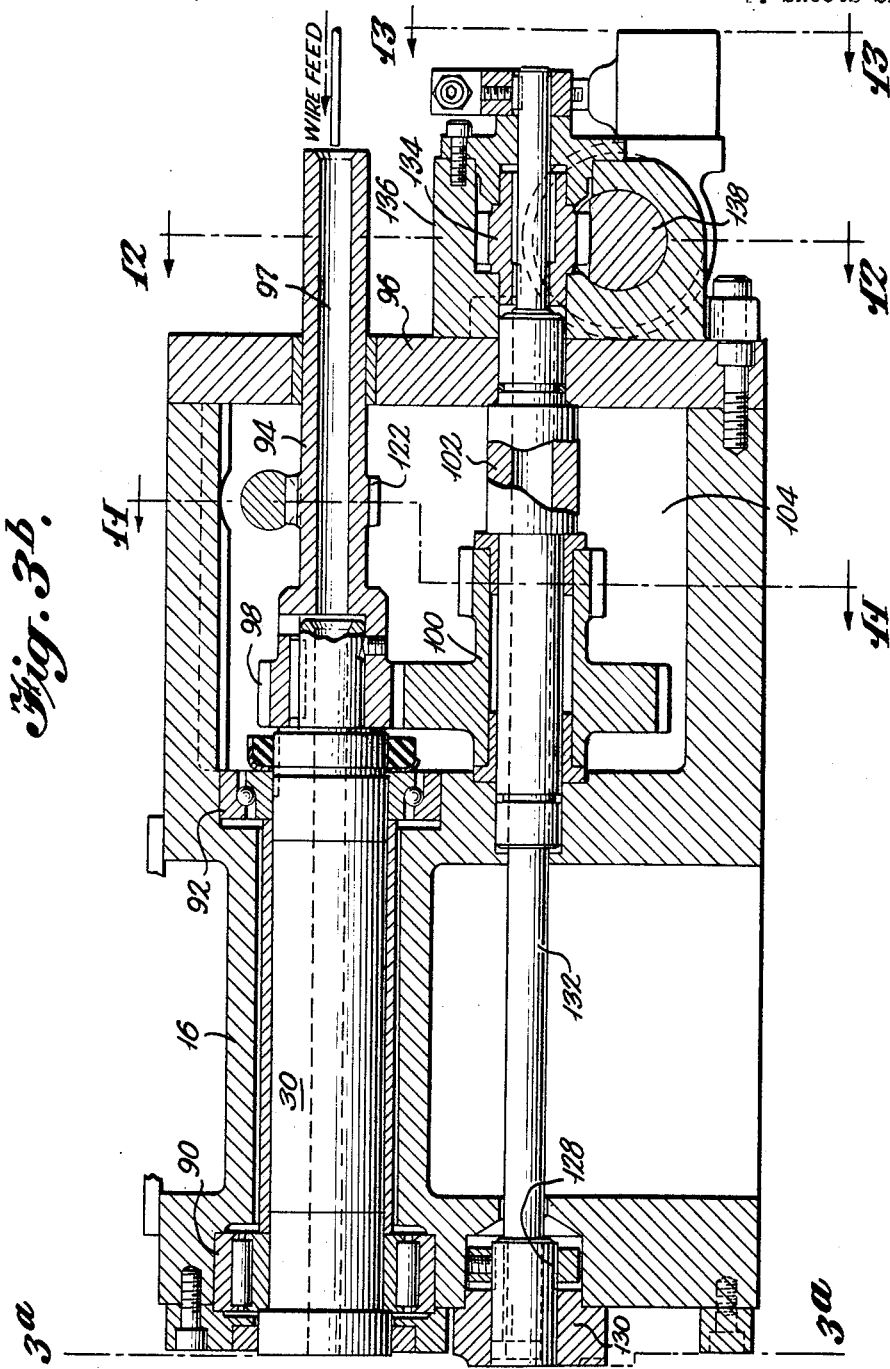

Feb. 3, 1970 E. G. OTT 3,493,016
WIRE BENDING MACHINE
Filed June 16, 1967 14 Sheets-Sheet 5

INVENTOR
Ernst G. Ott

BY
Lane, Aitken, Dunner & Ziems
ATTORNEYS

Feb. 3, 1970  E. G. OTT  3,493,016
WIRE BENDING MACHINE
Filed June 16, 1967  14 Sheets-Sheet 6

INVENTOR
Ernst G. Ott

BY
Lane, Aitken, Dunner & Ziems
ATTORNEYS

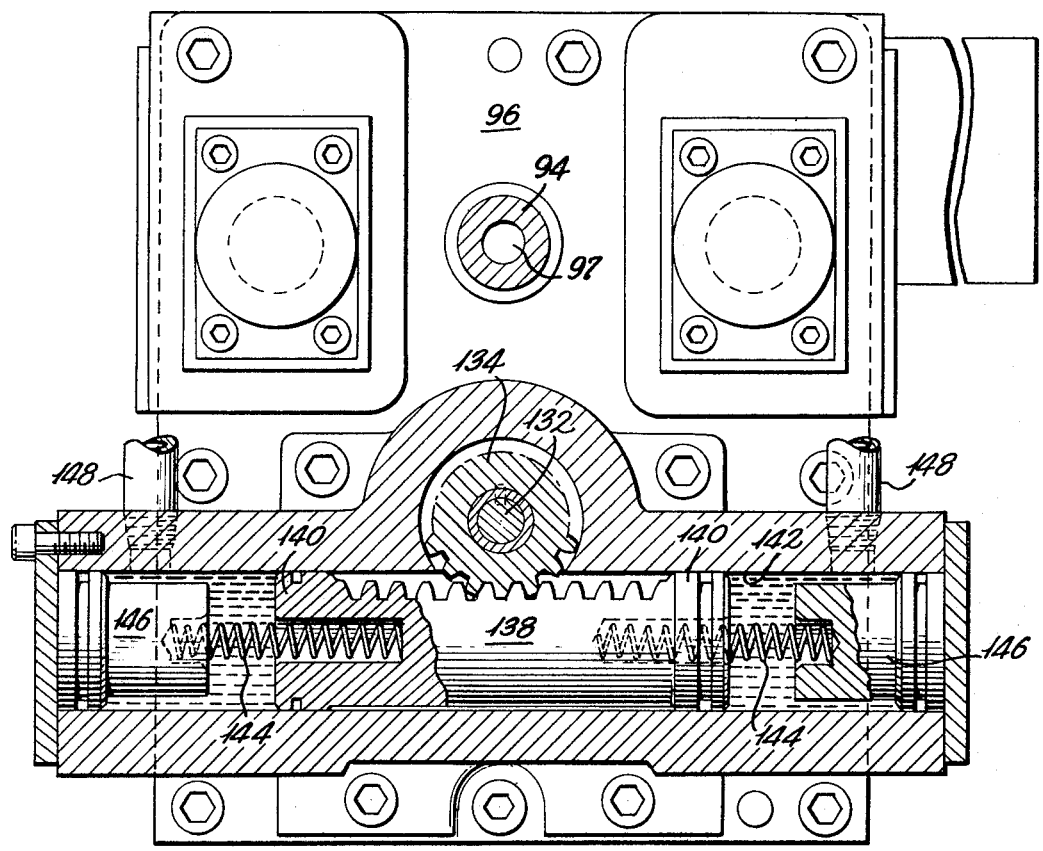
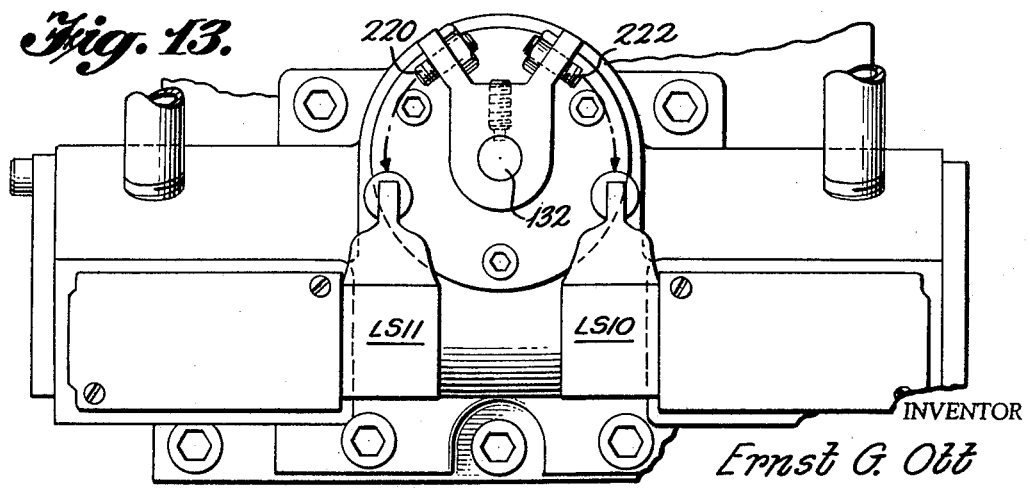

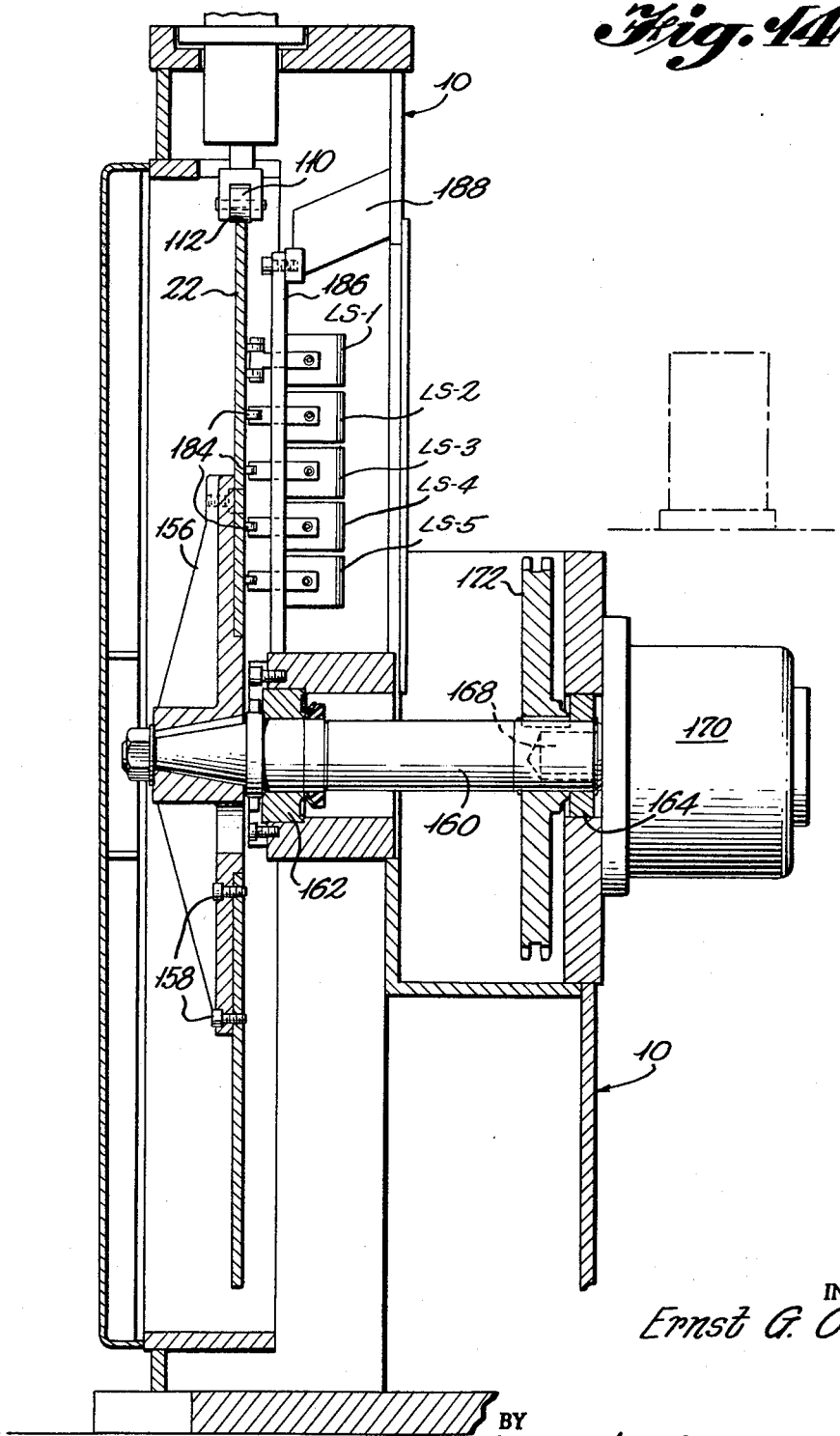

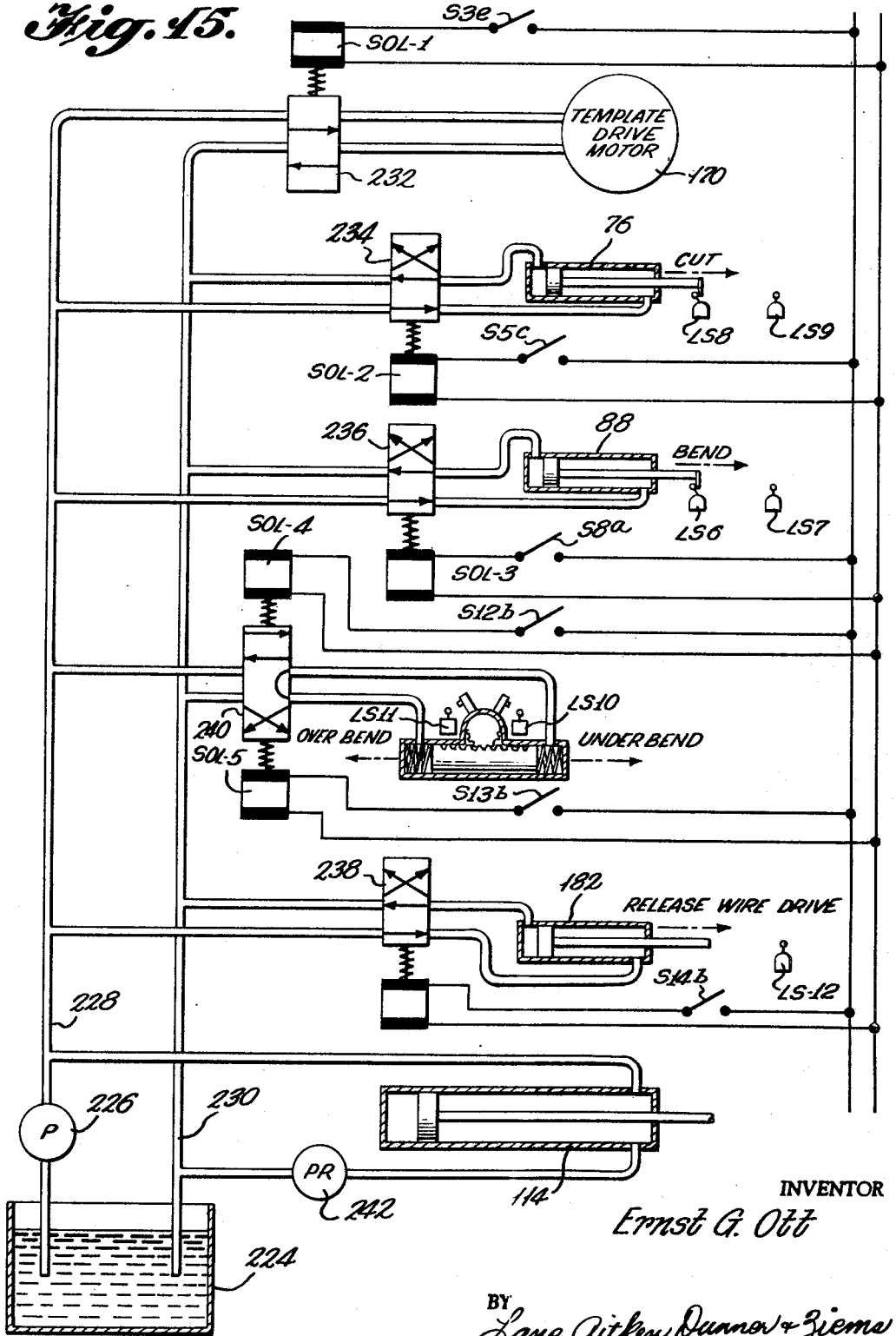

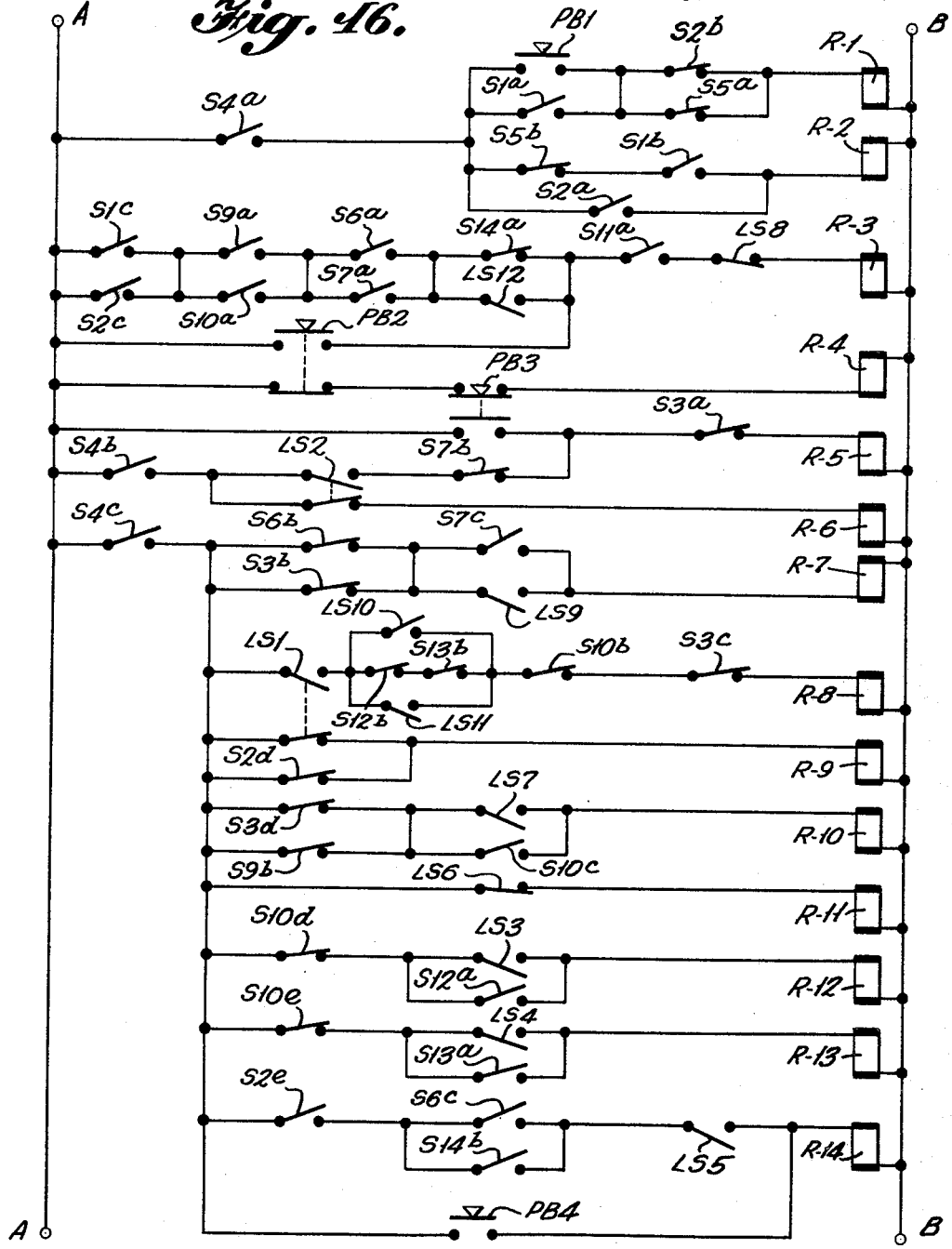

Feb. 3, 1970
E. G. OTT
3,493,016
WIRE BENDING MACHINE
Filed June 16, 1967
14 Sheets-Sheet 11
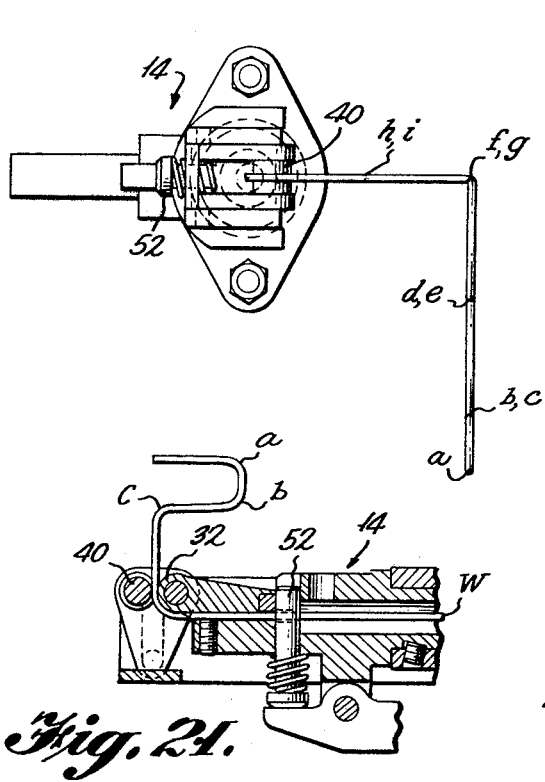
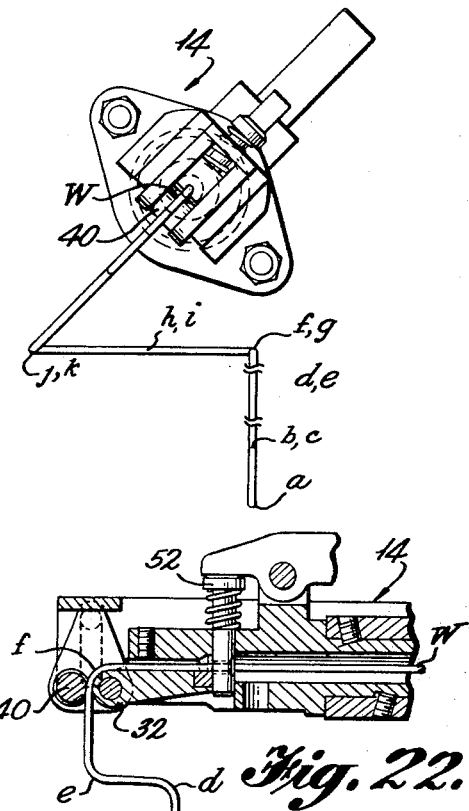
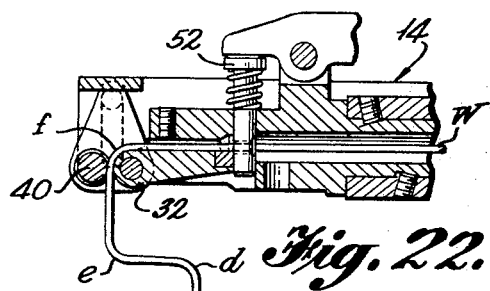
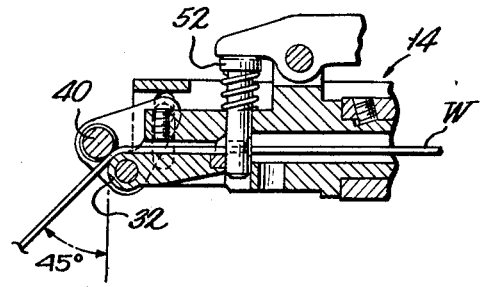
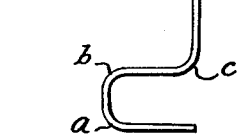
INVENTOR
Ernst G. Ott
BY
Lane, Aitken, Dunner & Ziems
ATTORNEYS

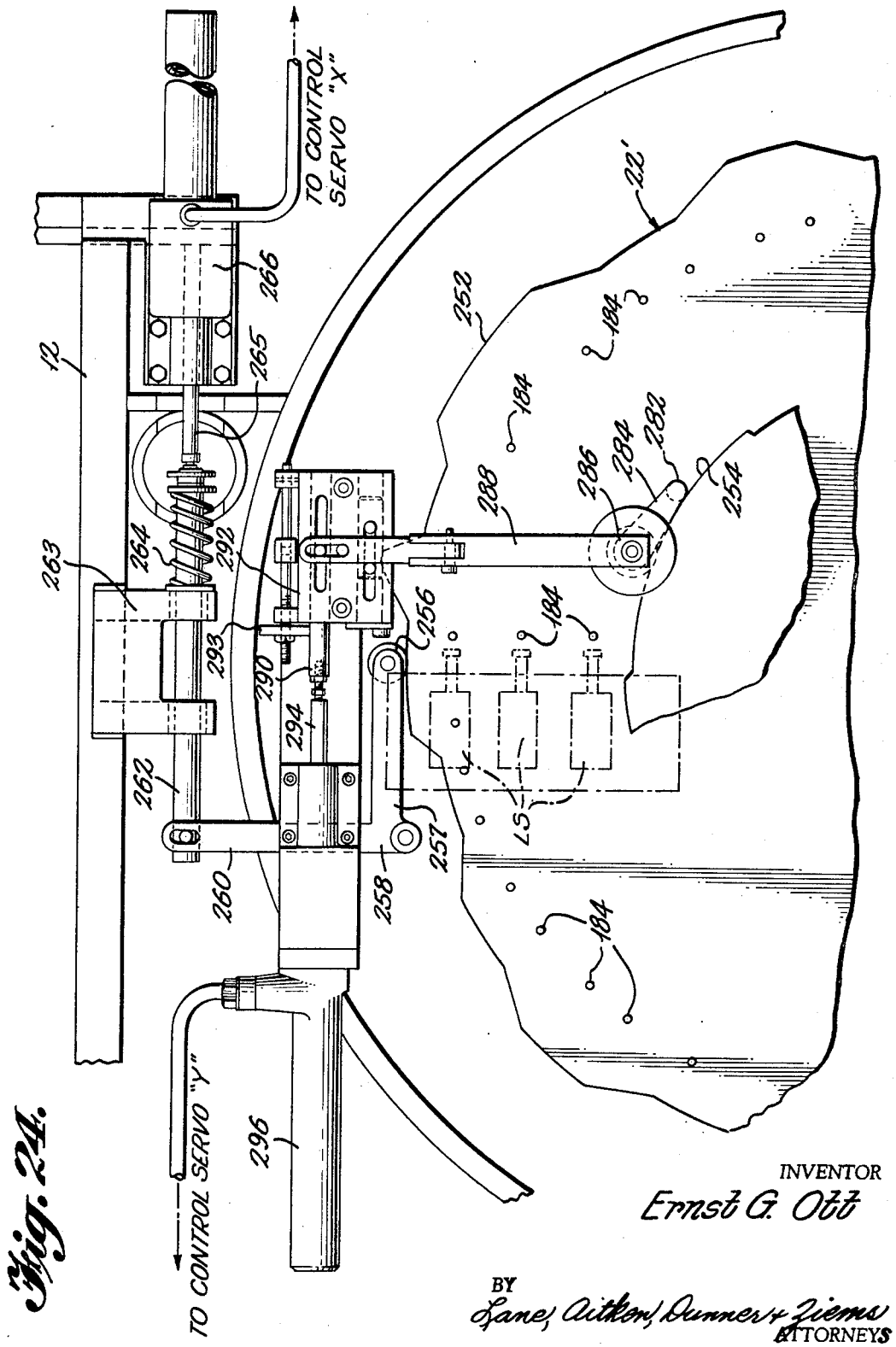

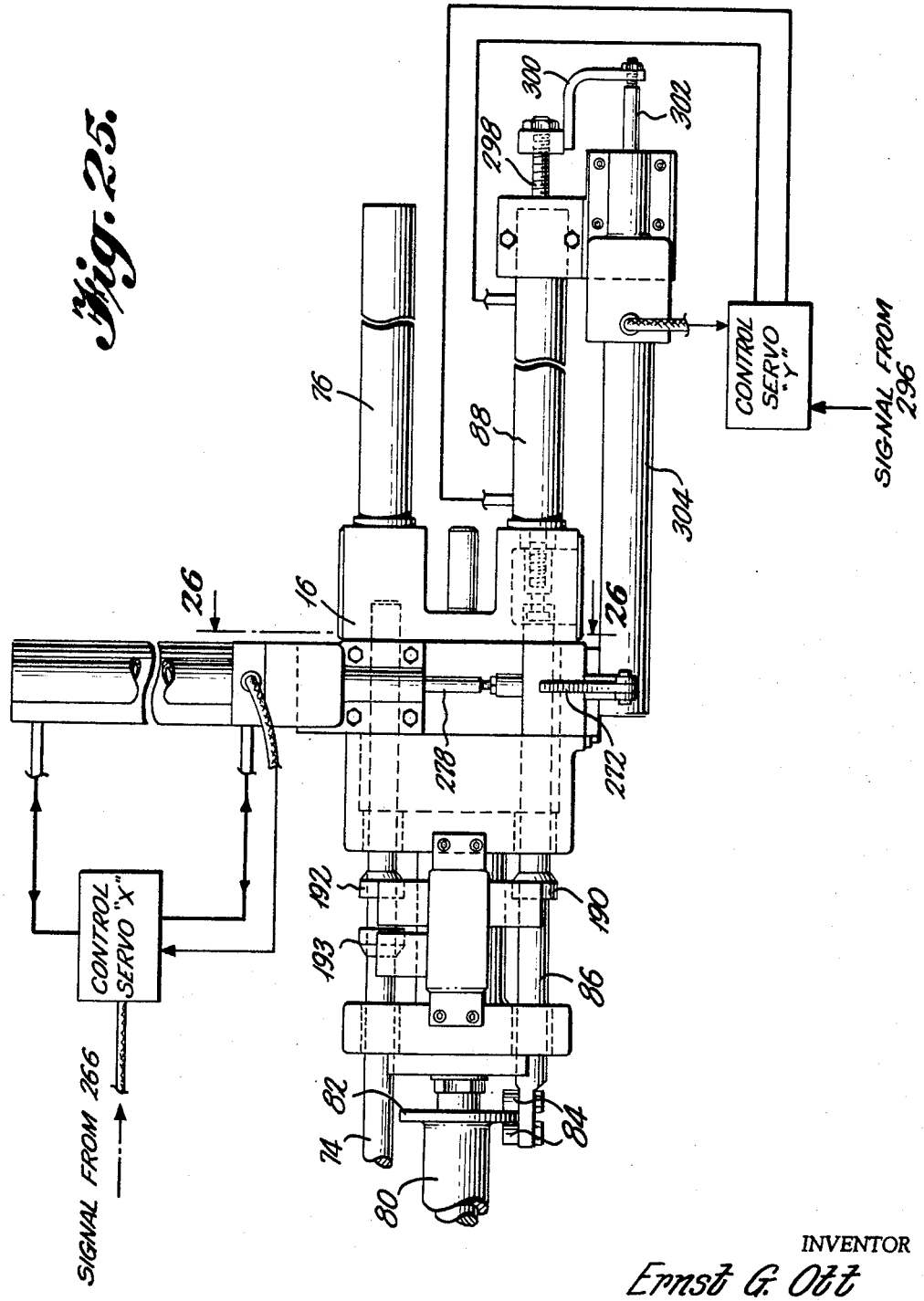

Feb. 3, 1970  E. G. OTT  3,493,016
WIRE BENDING MACHINE
Filed June 16, 1967  14 Sheets-Sheet 14

INVENTOR
Ernst G. Ott

BY
Lane, Aitken, Dunner + Ziems
ATTORNEYS

United States Patent Office 3,493,016
Patented Feb. 3, 1970

3,493,016
WIRE BENDING MACHINE
Ernst G. Ott, Dearborn, Mich., assignor to Lear Siegler, Inc., a corporation of Delaware
Filed June 16, 1967, Ser. No. 646,516
Int. Cl. B21f 35/04; B21c 51/00
U.S. Cl. 140—71                    36 Claims

ABSTRACT OF THE DISCLOSURE

This disclosure contains drawings and a description of an improved machine for bending linear stock material, particularly wire to form undulating or zig-bag springs of the type used in furniture or automotive seat cushions. The machine features a rotatably mounted bending head disposed on the axis of the material to be bent so that the rotational or angular position of the head on the axis will determine the radial plane in which a bend is made upon actuation of the head. Stock material feed, as well as head angle position and cycle control are synchronized by the relation of these functions to a programming cam template so that the ultimate configuration formed, such as a spring for example, will be determined by the particular template used. To this end, the template is interchangeable with other templates. The machine includes further an adjustable bend stop arrangement so that the angle of bend in a single bending place may be predetermined and incorporated in a programmed bending cycle.

BACKGROUND OF THE INVENTION

The present invention relates to a machine for bending linear stock material such as wire, rods, tubes and the like. More particularly, it concerns an improved machine for forming automatically undulating or zig-zag springs of the type used in furniture and automotive seat constructions.

In a copending application Ser. No. 456,981, filed May 19, 1965 by the present inventor, now U. S. Patent No. 3,393,714, there is disclosed a wire bending machine generally characterized as having a carriage supported, rotatable bending head movable along a straight length of spring wire stock under appropriate controls to form substantially any shape of zig-zag spring in one continuous operation. The bending head is rotatable about the axis of the spring wire stock, and in the preferred embodiment, is moved relative to the wire by advancing the carriage along ways spaced sufficiently from each other and the head to enable the formation of a spring of standard length. The carriage position on the ways, therefore, establishes the point on the wire where a single plane bend is to be made. The angular position of the head about the axis of the wire, on the other hand, establishes the radial direction or plane in which the bend is made upon actuation of the head. Both the carriage position along the length of the wire and the angular position of the head about the axis of the wire are controlled by an interchangeable programming device, such as a replaceable cam track or the like, adapted to be followed by a control element on the carriage or head. The various operating components of the machine are driven by fluid motors operated by an electrical control system.

Machines of the type to which this and the aforesaid copending application relate have been found extremely effective in practice both from the standpoint of reducing the time required to adapt the machine to the formation of different shaped springs and also from the standpoint of producing springs of higher quality than more conventional spring forming machines. In the latter respect, the improved spring characteristics are believed to be as a result of enabling each bend in the wire to be formed in a single bending step from a reasonably straight wire. This is in contrast to previously conventional machines which not only required the spring stock to be bent entirely within a single plane and then again bent out of the plane at various points, but also, they required extremely straight wire stock to start with. As a result of the numerous straightening and bending operations that were required to be performed on the wire stock, the wire stock became cold-worked, thereby losing a substantial part of its inherent spring or resilient properties.

SUMMARY OF THE INVENTION

In accordance with the present invention, the desirable attributes of the machine disclosed in copending application Ser. No. 456,981 filed May 19, 1956, are retained while at the same time providing various improvements and/or additional desirable features. Generally, a significant reduction in size of the machine is achieved by mounting the rotatable bending head in a fixed position projecting from the machine frame or support in cantilever fashion so that no provision need be made for permitting free movement of the formed spring or bent wire about the rotatable axis of the head. The spacing between various bends made on the wire is regulated by a wire feed mechanism synchronized with the bending head angle by a rotatably driven cam template. The template is interchangeable with other similar but differently shaped templates and also carries a plurality of controlling limit switch actuating devices so that the complete bending cycle may be altered as desired merely by using the appropriate template. The machine of the present invention further includes an improved bending head together with a mechanism offering added facility for determining the angle through which the wire is to be bent in a given bending plane.

Among the objects of the present invention are therefore; the provision of an improved wire bending machine capable of being actuated automatically to produce a series of bends in a generally linear stock material at precisely spaced points and in any desired radial bending plane that may be required to form a particular configuration; the provision of a bending machine of the type referred to which is compact and requires a minimum of floor space; the provision of a wire bending machine having an improved bending head which enables the making of a bend through any given angle with a minimum of cold working of the wire; the provision of a wire bending machine of the type referred to which provides enhanced facility for controlling both the angular position of the bending head within extremely close tolerances and the angle of a single plane bend; and the provision of an improved control mechanism for a wire bending machine of the type referred to above.

Other objects and further scope of applicability of the present invention will become apparent from the description to follow below taken in conjunction with the accompanying drawings in which like reference numerals designate like parts.

BRIEF DESCRIPTION OF THE DRAWINGS

FIG. 1 is a fragmentary side elevation of a bending machine in accordance with this invention;

FIG. 2 is an enlarged fragmentary plan view as seen from line 2—2 of FIG. 1;

FIGS. 3a and 3b are enlarged fragmentary cross-sectional views taken respectively on lines 3a—3a and 3b—3b of FIG. 2;

FIG. 4 is an enlarged fragmentary plan view showing various components of the bending head in different relative operative positions from that shown in FIG. 2;

FIG. 5 is an enlarged fragmentary cross-section taken 1 line 5—5 of FIG. 2;
FIG. 6 is a cross-section taken on line 6—6 of FIG. 5;
FIG. 7 is an enlarged fragmentary cross-section taken 1 line 7—7 of FIG. 3a;
FIG. 8 is an enlarged cross-section taken on line 8—8 ! FIG. 3a;
FIG. 3a;
FIG. 11 is an enlarged cross-section taken on line 11—1 of FIG. 3b;
FIG. 12 is an anlarged cross-section taken on line 12—2 of FIG. 3b;
FIG. 13 is an enlarged fragmentary end elevation as :en from line 13—13 of FIG. 3b;
FIG. 15 is a schematic diagram illustrating a hydraulic rcuit for operating the machine illustrated in FIGS. –14;
FIG. 16 is a circuit diagram used with the hydraulic ircuit of FIG. 15;
FIGS. 18-20 are end elevations of the wire bending ead of this invention during different phases of forming ie spring illustrated in FIG. 17;
FIGS. 21-23 are fragmentary cross-sectional views hrough the wire bending head at various forming phases f the spring shown in FIG. 17;
FIG. 24 is a fragmentary side elevation showing the rogramming control for an alternative embodiment of nis invention;
FIG. 25 is a fragmentary plan view of the alternative mbodiment.

DESCRIPTION OF THE PREFERRED EMBODIMENTS

Figure 9:
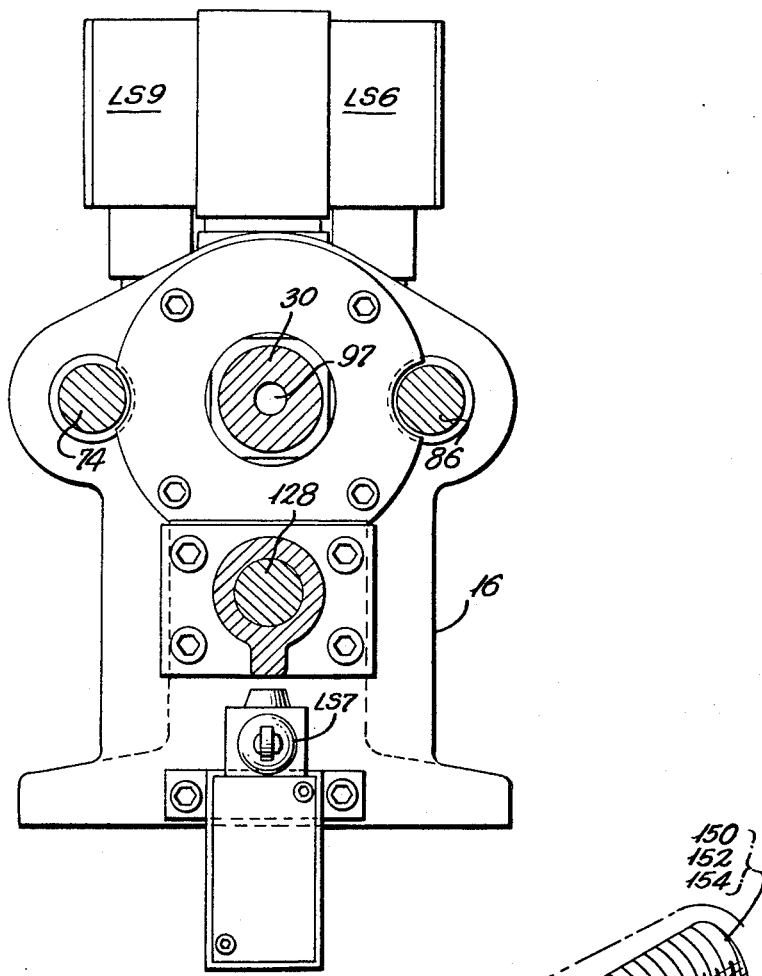
FIG. 9 is an enlarged cross-section taken on line 9—9.
Figure 10:
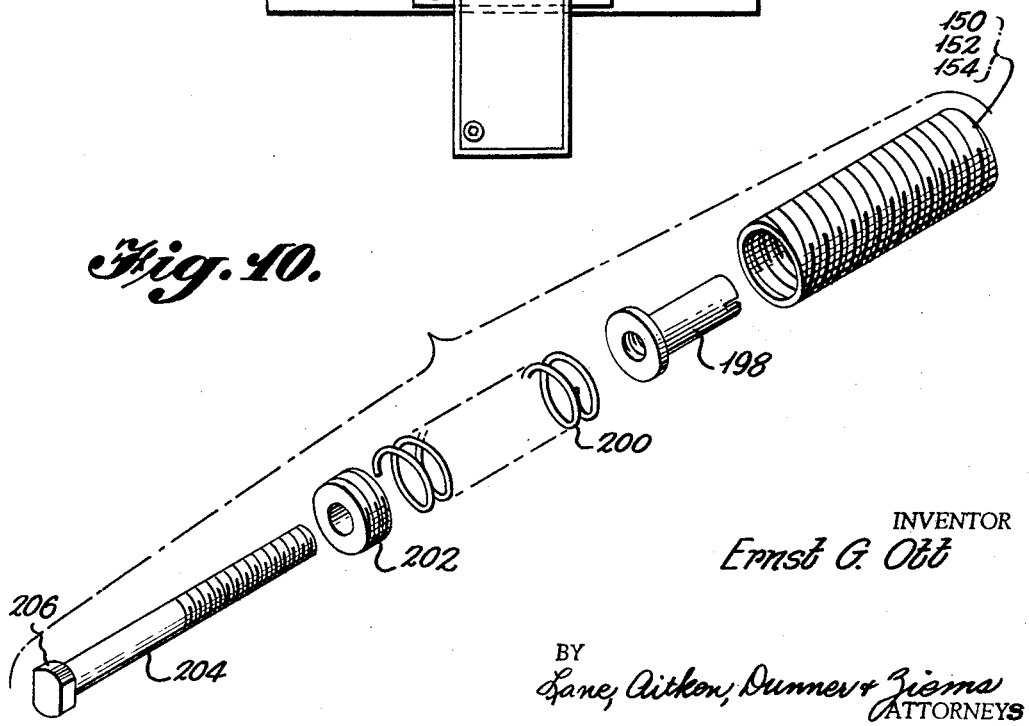
FIG. 10 is an exploded view showing the components : a bending quill stop in accordance with one embodiment of this invention.

One embodiment of the present invention is illustrated n FIGS. 1-16 of the drawings. As shown in these figures, ind particularly in FIGS. 1 and 2, the bending machine )f this invention generally includes a supporting frame l0 having an elongated horizontal bed 12 on which /arious working components of the machine are sup- )orted. These components include a bending and cutoff 1ead assembly 14, a head driving and support housing l6, a feed mechanism 18 and a wire straightening device !0. A rotatable programming control cam, designated )y the reference numeral 22, is housed within the sup- )orting frame 10. Also, a housing containing various con- :rol elements and power generating devices, such as a 1ydraulic fluid pump, are contained in a housing 24 supported under the bed 12.

As shown most clearly in FIGS. 3a and 5-7, the bend- ng and cutoff head 14 includes an elongated wire guide member 24 having a circular boss 26 secured by set screws 28 in a counter bore formed on the end of an elongated :ubular spindle 30 to be described in more detail below. The front or projecting end of the guide member 24 terminates in a rounded or cylindrical bending anvil 32 which merges tangentially with a longitudinal wire guide bore 34 of a diameter to accommodate the largest liameter of a wire W or other linear stock material to be bent. A radial set screw 36 in the guide member 24 provides a measure of adjustment in the effective diameter of the guiding bore 34 to insure that the wire W will be held against the surface of the guide bore adjacent the anvil 32. The guide bore 36 opens to an enlarged counter bore 38 which, as shown in FIG. 5, forms an extension of the inside diameter of the tubular spindle 30. A bending die in the form of a grooved roller 40 is journaled in a pair of bell crank arms or plates 42 mounted for pivotal movement about a pin 44 extending centrally through the anvil 32. Thus it will be appreciated that the wire W, fed between the roller die 40 and the anvil 32, will be bent about the anvil upon movement of the die 40 in a circular path about the axis of the pin 44 which coincides with the axis of the anvil 32. To effect this movement, a pair of actuating pins or studs 46 projecting outwardly from the crank plates 42 on an axis displaced from the axis of the pin 44 are received in vertically disposed cam slots 48 formed in a reciprocal bending die actuating member 50 slidably mounted on the spindle 30. By reference to FIG. 3a, it will be noted that the studs 46 are constrained by the slots 48 to an arcuate path of less than 90° to either side of a transverse plane passing through the axes of the anvil 32 and die 40 when the latter is in its starting or retracted position. This arrangement avoids a dead-center position of the crank plates 42.

To provide for cutting the wire W, a cutoff pin 52 having a wire aperture 54 is slidably mounted in a transverse bore provided in the guide member 24. As shown in FIG. 5, the pin 52 is biased outwardly by spring 55 to a position of where the aperture 54 generally aligns with the wire guide aperture 34 in the guide member 24. A cutting die 56 is mounted in the guide member 24 so that movement of the pins 52 inwardly, will effect a shearing action between the edge of the aperture 54 and the cutting die 56 to sever the wire W. To move the pin 52 in this manner to cut the wire, the head of the pin underlies one end of a lever arm 58 pivotally supported from the guide member 24 by a pin 60. As shown most clearly in FIG. 4, the arm 58 is bifurcated at its rearward end to receive a pair of spaced cam follower rollers 62 and 64. As shown in FIG. 3a, the rollers 62 and 64 lie on opposite sides of an inclined cramming finger 66 projecting from a cutoff quill 68 slidably and rotatably mounted on the head spindle 30. The quill 68 is formed with a circular flange 70 to be engaged on opposite sides by a pair of rollers 72 mounted on a cutoff die actuating rod 74. The rod 74, as shown in FIG. 2 of the drawings, is connected to the piston of a piston-cylinder hydraulic motor 76 mounted on the housing 16. Thus it will be appreciated that actuation of the motor 76 to advance the rod 74, and thus the quill 68 forwardly, will cause the roller 62 to ride up on the front cam surface of the finger 66, in turn causing the lever arm 58 to move the cutoff pin relative to the guide 56 and sever the wire in the manner described. Correspondingly, rearward movement of the quill 68 by the motor 76 will cause the roller 64 to ride downwardly on the rear surface of the camming finger 66 to move the lever arm into a neutral position. Because of the spring 55 biasing the pin 52 into engagement with the lever arm 58, the cutoff pin 52 will be properly aligned with the guide aperture 34 in the head guide member 24.

As shown most clearly in FIG. 2 of the drawings, the bending die actuating slide 50 is connected by a pair of rods 78 to the front end of a bending quill 80 slidably and rotatably carried on the head spindle 30. Because the bending quill 80 is situated behind the cutting quill 68, the flange 70 in the cutoff quill is apertured to accommodate the rods 78. The bending quill 80 also has a circular flange 82 for engagement by a pair of rollers 84 mounted on a bending quill actuating rod 86 operatively connected to a hydraulic bending motor 88 mounted on the housing 16. Thus it will be seen that when the motor 88 is actuated to advance the rod 86 toward the head 14, the bending die actuating slide 50 will move forward to carry the roller die 40 through the circular or arcuate path described above and as shown in FIG. 3a of the drawings.

It will be appreciated that the bending head organization described thus far will operate to bend the wire W in a single plane. To change the plane of the bend, however, it is necessary that the pivotal plane of the bending die 40 be adjustable angularly about the axis of the wire W. To accommodate this angular or rotatable movement of the head 14 relative to the wire W the spindle 30, on which the head is mounted, is rotatably supported in the housing 16 on spaced bearings 90 and 92 as shown most clearly in FIG. 3b. Also, it will be noted that the bearing 92 is a combined radial and thrust bearing to constrain the spindle 30, and thus the head 14, in a fixed axial position relative to the respective cutoff and bending quills 68 and 80. Also, it will be noted that the rear end of the tubular spindle 30 is keyed to a hollow shaft extension 94 journaled in the rear wall 96 of the housing 16 to establish a continuous straight wire feed passage 97 from the shaft extension 94 to the head 14.

The manner in which the angular position of the spindle 30, and thus of the head 14, is controlled in the present embodiment, may be understood by reference to FIGS. 1, 3b, 11 and 14 of the drawings. As shown in FIG. 3b, the shaft extension 94 is formed having a gear 98 on its front end in mesh with a double pinion gear 100 journaled on a hollow trunnion shaft 102 extending between the rear wall 96 and the front wall portion of a sealed gear chamber 104 in the housing 16. As shown in FIG. 11, a vertically disposed rack 106 slidably mounted within a guide tube 108 secured to the housing 16 is in mesh with the double pinion gear 100. The lower end of the rack 106 carries a cam follower roller 110, which in turn, engages a peripheral cam pattern 112 on the programming control template 22. To insure contact of the follower 110 with the cam 22, and also to minimize back lash through the gears 98 and 100 and the rack 106, a hydraulic pressure bias is imposed on the shaft extension 94 in a direction tending to move the cam follower 110 into engagement with cam 22. This pressure bias is developed by a motor 114 having a piston (not shown) connected by a rod 116 to a horizontally disposed rack 118 movable in slide bearings 120 on opposite sides of the gear chamber 104. The rack engages a pinion 122 formed integrally on the shaft extension 94. Thus, and as shown in FIG. 11 of the drawings, a biasing force exerted by the motor 114 to the right of FIG. 11 will exert a clockwise bias on the gear 98, a counter clockwise bias on the double pinion gear 100, and a downward bias on the rack 106 and cam follower 110.

Although the operation of the bending head to form a zig-zag spring of a configuration shown in FIG. 17 will be described in more detail below, it might be noted at this point that the length of the arc or angle through which the wire bending roller die 40 moves in its path about the cylindrical anvil 32 will determine the angle to which the wire is bent in the single bending plane. For example, to make a 90° bend in the wire W, the roller will move approximately through a 90° arc, beginning from its starting position on a transverse or radial line normal to the wire W. Correspondingly, movement of the die through less than 90° will result in a smaller bend angle in the wire (i.e., an "underbend") and longer arcs of the die will produce bend angles greater than 90° (i.e., an "overbend").

In accordance with the embodiment of the present invention shown in FIGS. 1–16, the angle through which the bending die 40 travels is rendered adjustable by a multiposition stop assembly engageable by the bending quill flange 82 and generally designated in the drawings by the reference numeral 124. A complete understanding of the stop mechanism 124 may be had by reference to FIGS. 1, 3a, 3b, 8–10, 12 and 13. As shown in FIGS. 3a, 3b and 8 of the drawings, a rotatable stop supporting disc 126 is fixed at the end of a shaft 128 journaled in a bracket 130 suitably supported on the front of the housing 16 under the bending quill 80. The shaft 128 is keyed at its rear end to a drive shaft 132 which extends through the hollow trunnion 102 in the sealed gear chamber 104 and which is keyed in turn at its rear end, to a pinion 134 contained within a motor housing 136 secured to the rear wall 96 of the housing 16. As shown in FIG. 12, the pinion 134 meshes with a rack 138 having piston heads 140 at opposite ends thereof slidable in a hydraulic cylinder 142 defined by the motor housing 136. The rack is biased by springs 144 to a central position and operates between a pair of fixed stops 146 secured at each end in the cylinder 142. Hydraulic lines 148 are provided to introduce hydraulic fluid into or out of the cylinder 142 on the sides of the respective pistons 140, to move the rack 138 from its central position, as shown in FIG. 12, to a left or right position as established by the stops 146.

The disc 126 has three angularly displaced, internally threaded axial apertures formed therein to receive externally threaded quill stops 150, 152 and 154, respectively (FIG. 8). In this embodiment, the central stop 152 constitutes a 90° bend stop whereas the stops 150 and 154 to either side of the central stop establish respectively, an underbend stop and an overbend stop. The stops 150, 152 and 154 are spaced angularly on the disc 126 so that only one stop at a time is positioned in front of the bending quill flange 82 where the disc 126 is rotated to one of three positions established by the rack 138 (FIG. 12); i.e., in its central position or against one of the two side stops 146. Thus it will be appreciated that the maximum forward position of the bending quill 80 and of the bending head slide 50, as the bending motor 88 is actuated to advance the quill 80, will be established by engagement of the flange 82 with one of the stops 150, 152 or 154 that is adjusted to the vertical position as shown in FIG. 8. Correspondingly, the arc through which the bending die roller 40 is moved will also be determined by the maximum forward position of the slots 48 in the slide 50.

Figure 14:
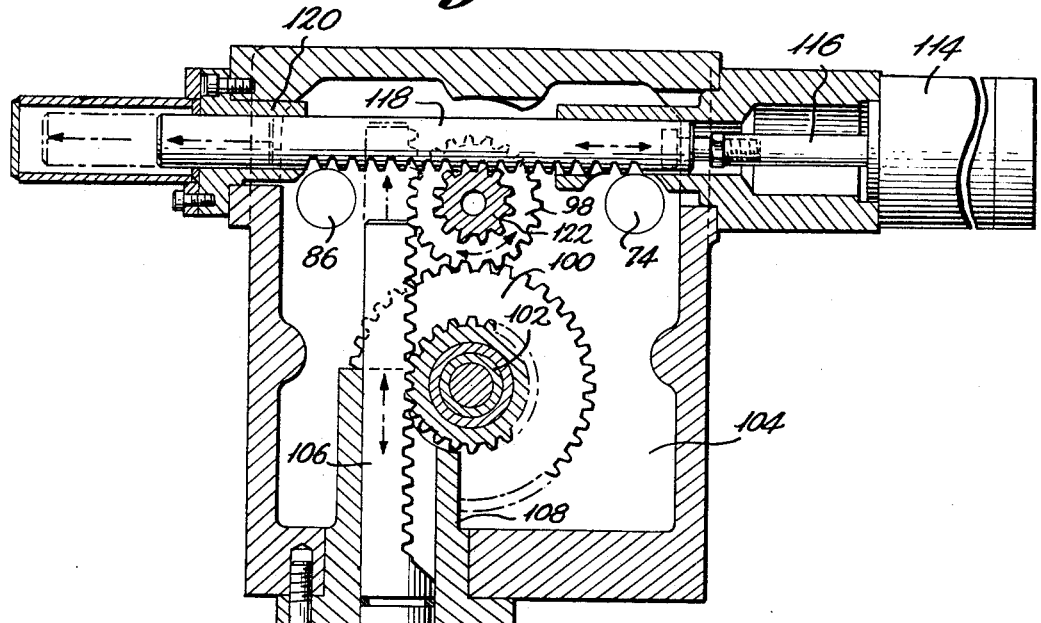
FIG. 14 is an enlarged fragmentary cross-section taken n line 14—14 of FIG. 1.

The construction of one form of the programming control cam 22 may be understood most clearly by reference to FIGS. 1 and 14 of the drawings. As shown, the cam 22 is in the form of a generally circular template carrying the peripheral cam pattern 112 for engagement by the follower 110 as described above and being removably mounted on a flanged hub 156 by suitable means such as screw bolts 158. The hub 156, in turn, is removably mounted on an axle 160 journaled in spaced bearings 162 and 164 carried by the frame 10. To enclose the cam, the front portion of the frame supports a hinged door 166 to facilitate access to the cam 22 as well as its removal by first removing the hub 156 and then removing the cam 22 from the hub 156. The axle 160 is splined or otherwise nonrotatably fixed to the shaft 168 of a rotary hydraulic motor 170. Also keyed on the axle 160 is a sprocket 172 coupled to a drive roller 174 in the wire feed mechanism 18 by a drive chain 176 (FIGURE 1). It will be noted further at this point that the wire feed mechanism includes a pressure roll 178 carried on a pivotal arm 180 connected to a hydraulic piston-cylinder motor 182. Hence rotation of the drive roll in synchronism with the cam 22 by the motor 170 will operate to advance the wire W toward the bending head 14 so long as the pressure roll 178 is urged against the drive roll 174 by the motor 182. Conversely, retraction of the pressure roll 178 by the motor 182 will terminate wire feed.

The cam template 22 also carries a plurality of timing pins 184 projecting from the rear face thereof as shown in FIG. 14, and arranged in circles of varying radii concentric with the template drive axle 160. In the embodiment above described, five limit switches LS1–LS5 are supported on a radial arm 186, in turn carried by a bracket 188 from the frame 10. As will become apparent from the description of the circuit diagrams of FIGS. 15 and 16 below, the limit switches LS1–LS5 effect the initial control functions by which the various hydraulic motors 76, 88, 142, 170 and 182 are actuated. It will be readily appreciated that the location of the pins 184 on the rear face template 22 will determine the point in a ending cycle at which these various functions are performed.

In addition to the limit switches LS1–LS5, other limit switches are provided, principally for the purpose of insuring that a particular machine condition is in readiness for a subsequent machine operation. Specifically, a limit switch LS6 mounted on the housing 16 as shown in FIG. cooperates with a camming collar 190 fixed on the bending head actuating rod 86 to signal or indicate the retracted position of the bending head. A pair of similar limit switches LS8 and LS9, mounted on the housing 16 and as shown in FIGS. 1 and 2 of the drawings, signal respectively the retracted and extended position of the cutting head quill 68 by cooperation with a pair of camming collars 192 and 193 on the rod 74.

The extended position of the bending head thus of the bending head quill 80 is signaled by tripping a limit switch LS7 shown in FIG. 3a of the drawings. To enable the switch LS7 to be tripped when the bending head quill is moved to its extended position, each of the stops 150, 152 and 154 is formed with a longitudinal bore 194 and an enlarged counter bore 196 to receive a flanged plunger 198. As shown most clearly in FIGS. 3a and 10 of the drawings, the plunger 198 is biased to a position such that the flange thereon is at the base of the counter bore 196 by a compression spring 200 abutting between the flange on the plunger 198 and an externally threaded collar 202 received within an internally threaded portion of the counter bore 196. A bolt-like member 204 having a head 206 is threadably fixed to the plunger 198 to complete the assembly of each of the stop members 150, 152 and 154. A rocker arm 208 having a semi-circular upper portion 210 is pivotally supported on a bracket portion 212 formed as the extension of the bracket 130. The lower leg of the arm 208 abuts against a plunger 214 spring biased forwardly by a spring 216 and carrying a switch tripping head 218 at its rearward end. Thus it will be seen that when the bending head quill flange 82 is advanced against either one of the stops 150, 152 or 154, the corresponding plunger 198 will be advanced to rock the arm 208 in a counter clockwise direction, as shown in FIG. 3a, to move the striking head 218 against the limit switch LS7. In this manner, the limit switch LS7 will be tripped upon the bending head reaching its extended position regardless of whether that position has been preselected for a normal bend, an overbend, or an underbend.

To signal the movement of either the underbend stop 150 or the overbend stop 154 to an operative position in front of the quill flange 70, a pair of limit switches LS10 and LS11 are provided as shown in FIG. 13 of the drawings. A pair of set screws 220 and 222 are mounted on a bracket keyed to the rear end of the shaft 132. Hence, when the overbend stop 154 is positioned in front of the bending head quill flange 70, the set screw 222 will trip the limit switch LS10 whereas movement of the underbend stop will be signaled by the set screw 222 to tripping the limit switch LS11. A further limit switch LS12 is positioned ahead of the wire feed engaging plunger or motor 182 as shown in FIG. 1 of the drawings.

The manner in which the various hydraulic motors 76, 88, 142, 170 and 182 are operated through a pre-established bending cycle under the control of the timing pins 184 and the limit switches LS1 to LS5 may be understood by reference to FIGS. 15 and 16 of the drawings. Each of these motors is illustrated schematically in FIG. 15 together with the electric and hydraulic circuitry employed to control their actuation. Hence, hydraulic fluid is pumped from a tank or sump 224 by a pump 226 into a supply line 228, ultimately to be returned to the sump 224 through a return line 230. The circulation of hydraulic fluid through the respective hydraulic motors illustrated is under the control of solenoid actuated, spring return valves, each of which is shown in its normal flow controlling position in FIG. 15. Hence, the template drive motor 170 is controlled by a normally closed, one-way valve 232 arranged to be moved to its pen position to admit fluid to and from the drive motor 170 upon energization of its associated solenoid SOL–1. Hence, it will be appreciated that the template drive motor 170 will be operative only when the solenoid SOL–1 is energized by closure of a relay switch S3e.

The cutting head actuating motor 76 is controlled by a two-way valve 234 normally positioned to admit hydraulic fluid from the line 228 in a manner to retract the piston thereof or position the cutting head in its rearward position. Energization of the solenoid SOL–2 by closure of a relay switch S5c will reverse the direction of flow through the motor 76 to advance the piston of the motor 76 and thus the cutting head. The bending motor 88 is similarly controlled by a valve 236 and solenoid SOL–3 under the control of a relay switch S8a. Likewise, the wire feed engaging roller actuating motor 182 is controlled by a two-way valve 238 under the control of a solenoid SOL–6 depending upon the position of a relay switch S14b.

The bending head stop positioning motor 142 which, as described above, includes a two-way piston 138 spring biased to its central or neutral position, is operated under the control of a three-way valve 240. In its neutral position, the valve 240 equalizes fluid pressure on opposite sides of the piston 138. When, however, the solenoid SOL–4 is actuated by closure of the relay switch S12b, the supply line 228 is connected to the left hand chamber to advance the piston 138 to the right to effect an underbend. Conversely, if the solenoid SOL–5 is energized, the valve 240 is positioned to connect the supply line 228 with the right hand chamber and move the piston 138 to the left to effect an overbend.

The biasing motor 114 is connected between the supply line 228 and the return line 230 at all times under the control of a pressure regulator 242.

It should be noted at this point that each of the motor position indicating limit switches LS6 to LS12 are normally open switches. Hence, and as depicted schematically to FIG. 15, the normally retracted position of both the cutting head motor 76 and the bending head motor 88 will operate to close the switches LS8 and LS6, respectively. Each of the other limit switches referred to will remain in their open position when the pump 226 is operated to supply fluid under pressure to the line 228.

In the circuit diagram of FIG. 16, fourteen relay coils designated R1–R14 respectively, will be energized by the completion of a circuit through the respective coils from the lines A and B. The switch contacts for each relay are designated by a prefix letter S followed by a numeral corresponding to the numeral suffix designating the relay coils. A small letter suffix in the designation of each relay switch serves to identify the individual switches actuated by energization of any of the relay coils R1–R14, respectively. Normally open relay switch contacts are illustrated as such in FIG. 16 whereas normally closed relay switches are also so indicated by the illustration of a closed relay switch. It might also be noted at this point that energization of certain of the relays will directly complete the circuits of the respective valve actuating solenoids illustrated in FIG. 15. For example, when the relay R3 is energized the switch S3e is closed to energize the solenoid SOL–1; energization of the relay R5 closes the switch S5c to energize the solenoid SOL–2; energization of the relay R8 closes the switch S8a to energize the solenoid SOL–3; energization of the relay R12 closes the switch S12b to energize the solenoid SOL–4; energization of the relay R13 closes the switch S13b to energize the solenoid SOL–5; and energization of the relay coil R14 closes the switch S14b to energize the solenoid SOL–6. In addition to the relay switches S1–S14 in FIG. 16, the limit switches LS1–LS12 are shown in the position they assume when the machine is at rest with the hydraulic pump 226 in operation. In other words, all of the limit switches are open with the exception of LS6 and LS8, which are operated by the bending head and cutting head, respectively. The limit switches LS1 and LS2 which are two-way switches biased to a normal position as shown. In addition, four push buttons are illustrated in the circuit and designated by the letter prefixes PB. These push buttons are manually operated switches also biased to the normal position shown.

It is apparent, therefore, that with the hydraulic pump 226 in operation, the position of the several switches illustrated in FIGS. 22 and 23 will be as shown in the drawings. To start a cycle of operation, the push button PB1 is closed to complete a circuit through the relay coil R1, the switch S4a having been closed by the energized character of the relay coil R4. When the push button PB1 is released, the circuit through the relay R1 remains due to a holding circuit through the switch S1a. The energization of the relay coil R1 also closes the switch S1b to energize the relay coil R2 and its associated holding circuit through the switch S2a.

At this point, it will be noted that the two-way limit switches LS1 and LS2 serve to complete the circuit through the relay coils R6 and R9, respectively, thereby closing the relay switches S6a and S9a. Since the relay coil R2 is energized also at this time, a circuit will be completed through the relay coil R3 by switches S2c, S9a, S6a, S14a, S11a and LS8, the latter limit switch being closed by the retracted position of the cutting head. Energizing the relay coil R3, as above mentioned, also closes the switch S3e (FIG. 15) to actuate the template drive motor 170. The template 22 will be rotatably driven by the motor 170 until the limit switch LS2 is tripped by one of the pins 184. It will be remembered also at this point that since the wire drive motor 182 is advanced by hydraulic pressure to hold the pressure roller 178 in engagement with the drive roller 174, wire feed will occur simultaneously with rotation of the template 22.

When the limit switch LS2 is tripped, the relay coil R5 is energized through S4b, LS2, S7b, and S3a. Immediately before energization of the relay R5, however, the relay R6 is de-energized, thereby permitting the switch S6a to open and de-energize the relay R3 to terminate operation of the template drive motor 170. When the relay R5 is energized, the switch S5c closes to reverse the position of the solenoid actuated valve 234 and advance the cutting head to its extended position thereby permitting the limit switch LS8 to open and bring about closure of the limit switch LS9. Closure of the limit switch LS9 energizes the relay coil R7 and its holding circuit through the switch S7c. This also closes the switch S7a to enable the circuit for the relay coil R3 for closure when the cutting head retracts to again close the limit switch LS8. Also, it will be noted that as soon as the limit switch LS9 had been closed by the cutting head reaching its extended position, the relay coil R5 was de-energized by opening of the switch S7b, thereby de-energizing by opening of the switch S7b, thereby de-energizing the solenoid SOL-2 to return the valve 234 to its original position under its spring bias. This function brings about retraction of the cutting head hydraulically, ultimately to close the limit switch LS8 and re-energize the relay coil R3 to initiate template rotation by actuating the template drive motor 170. Also rotation of the template will restore the limit switch LS2 to its original position.

The template will continue to rotate until the limit switch LS1 is tripped to de-energize the relay coil R9 and thus de-energize the relay coil R3 to terminate template drive by opening the switch S9a. Also, at this point, the relay switch S9b is restored to its normally closed position. Then, the circuit through the relay coil R8 is completed through LS1, S12b, S13b, S10b and S3c. As soon as the relay coil is energized, the switch S8a (FIG. 15) is closed to actuate the bending head motor 88 and open the limit switch LS6 to de-energize the relay coil R11, permitting the switch S11a to open. As soon as the bending head is in its extended position, the limit switch LS7 is closed to energize the relay coil R10 through the switches S9b and LS7. The holding switch S10c is also closed, as is the switch S10a to enable the circuit through the relay coil R3 for completion by closure of the switch S11a. As soon as the relay coil R10 is energized, the switch S10b opens to de-energize the relay coil R8 and open the switch S8a thereby effecting a hydraulic return of the bending head to close the limit switch LS6 and complete the circuit through the relay R3 by closing the switch S11a to restart the template drive. As soon as the pin 184 that initially tripped the limit switch LS1 moves, the limit switch LS1 is restored to its original condition.

If either of the limit switch switches LS3 or LS4 are tripped to energize the relay coils R12 or R13 to cycle either an overbend or an underbend, respectively, the valve 240 is moved by either of the solenoids SOL-4 or SOL-5 to rotate the bending head quill stop disc 126 accordingly. Since the switches S10d and S10e will be closed at al times except when the relay coil is energized by movement of the bending head to its extended position, the circuits through the relay coils R12 and R13 are disabled when the bending head is in its extended position. Also it will be noted that the limit switches LS10 and LS11, which indicate either can overbend or an underbend respectively, must be closed after actuation or energization of either of the relay coils R12 or R13 in order for the relay coil R8 to be energized and effect a bending cycle.

Closure of the limit switch LS5 by a pin 184 on the cam template 22 will complete a circuit through the relay coil R14 closing the switch S14 to disengage the wire feed by retraction of the piston of the motor 182 and the pressure roll 178. The retraction of the wire drive will close the limit switch LS12 to enable the template drive motor relay R3. In this manner, the drive can be disengaged while enabling continued rotation of the template drive to trip, for example, the limit switch LS2 to effect a cutoff cycle at the end of a spring forming operation. Should it be desired to establish template rotation manually to cut the wire or disengage the wire feed, the push buttons PB2, PB3 and PB4 may be used. Also, it will be noted that when both limit switches LS2 and LS5 are tripped simultaneously, the relay coil R14 will remain inactive, by opening the switch S6c, and wire feed will not be interrupted.

Figure 17:
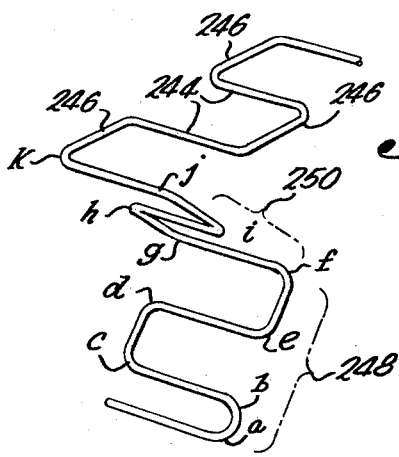
FIG. 17 is a fragmentary perspective view of a zig-zag oring formed by the machine of the present invention.

In order to understand the manner in which the apparatus described operates in practice, reference will be had to an example of a typical undulating or zig-zag spring which is shown in FIG. 17 of the drawings. Such springs comprise a series of laterally extending torsion bars 244 connected alternately on opposite sides by bending bars 246. Also it will be noted that the undulations established by the torsion bars and bending bars may lie in different planes. In a typical seat cushion, for example, the front and rear portions of the spring are formed having lengths 248 and 250 which lie in planes intersecting each other at an angle. Thus, in the spring shown in FIG. 17 the length 248 is established at one end by a loop for connection to a frame having closely spaced bends *a* and *b*. Further bends *c, d, e* and *f* serve to complete the length 248. The length 250 is begun by a bend *g* in a plane making approximately a right angle with respect to the plane established by bends *a–f*. The section or length 250 is then completed in the spring shown by bends *h, i* and *j*. The primary cushion support portion of the spring begins with a bend *k* and continues with subsequent bends, each of which may depart slightly from the plane of the preceding bend to establish the arcuate configuration required by the seat cushion design.

From the description of the wire bending machine illustrated in FIGS. 1 to 14 of the drawings, and the circuit diagrams of FIGS. 15 and 16, it will be apparent to those killed in the art that the particular shape of the spring to be formed, such as the one illustrated in FIG. 17, is predicated on the shape of the peripheral cam 112 and the arrangement of timing pins 184 on the programming template 22. In light of this feature, and as above mentioned, by stocking a series of differently arranged programming cam templates 22, it is necessary only to select the proper template for a particular shape of the spring to be formed.

When the desired cam template 22 has been mounted on the hub 156 (FIG. 14), and assuming the wire W to be positioned as shown in FIG. 5 extending through the aperture 54 in the cutoff pin 52, the spring forming cycle is initiated by pressing the push button PB1, it being assumed further that the pump 226 is running. As described in connection with the circuit diagrams of FIGS. 15 and 16, the limit switches LS1 to LS5 will effect first a cutoff of the wire and then the series of bends, such as the bends a–k followed by a further cutoff and new cycle, wire feed from a coil or other suitable supply (not shown) occurring between the bends simultaneously with rotation of the template 22. It is preferred that a continuous supply of the wire W be used so that as each spring or other bent material product is completed, the latter is severed from the wire W and the product forming cycle repeated. In this way no additional handling of the wire supply is required for the successive formation of individual springs, for example, other than occasional replacing a coil of wire.

Figure 18:
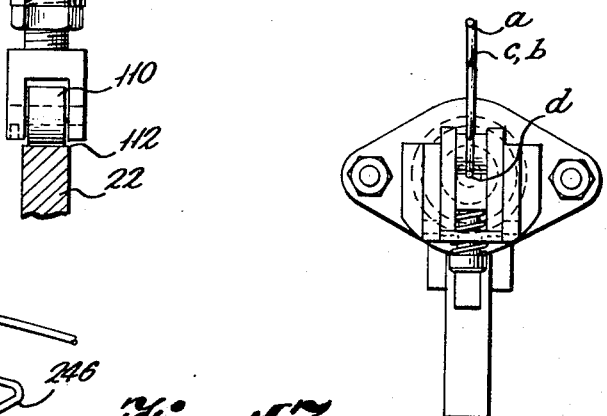

The angular positions of the bending head about the axis of the wire W during the formation of a spring such as the one illustrated in FIG. 17 are depicted by FIGS. 18–22. As above mentioned, this angular position of the bending head is established by the peripheral cam pattern on the template 22 engaged by the follower 110 in the embodiment described above. Hence, and as shown in FIGS. 18 and 21, during the formation of the bends a–f the bending head will be positioned so that the roller die 40 moves in a generally vertical plane, oscillating approximately 180° between successive bends to form the spring section 248. Through the formation of the bends g–j to form the section 250 in a plane approximately at right angles to the plane of the section 248, the cam template moves the bending head to an angular position illustrated in FIG. 19 and to position 180° disposed therefrom in the formation of the section 250. Similarly, the bend k and successive bends in the spring are formed with the bending head at a position approximating that illustrated in FIG. 20 of the drawings. FIG. 23 illustrates the formation of an underbend of approximately 45° by position such as would occur when the underbend stop 150 is positioned in front of the bending head quill 80.

Figure 26:
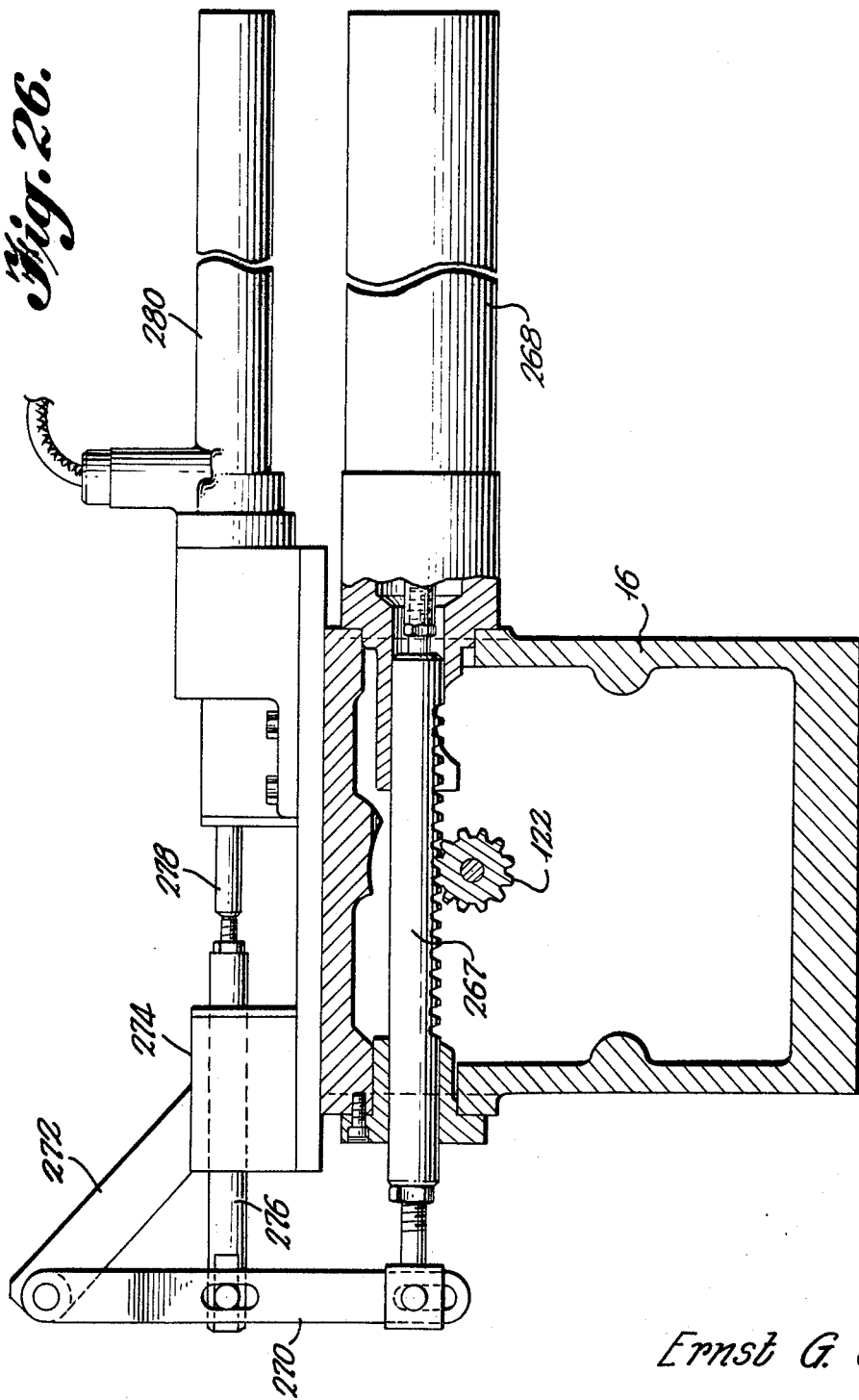
FIG. 26 is a fragmentary cross-section taken on line .6—26 of FIG. 25.

An alternative embodiment of the bending machine of this invention is illustrated in FIGS. 24–26 of the drawings. In these figures, parts which are identical to parts incorporated in the embodiment described above are designated by like reference numerals. The embodiment of FIGS. 24–26 differs from the embodiment of FIGS. 1–16 principally in the control means for establishing the angular position of the bending head about the axis of the wire W and in the control of the stroke of the bending head motor 88 and thus of the bending head quill 80. In this latter respect, the embodiment of FIGS. 24–26 enables an infinite variation in bending head stroke whereas the embodiment of FIGS. 1–16, as described, is limited to three stroke length positions established by the stops 150, 152 and 154.

Both of the aforementioned position control functions in the alternative embodiment are effected electronically by the use of linear variable differential transformers available commercially from Schaevitz Engineering, Pennsauken, N.J. These devices are disclosed in a Schaevitz Engineering Technical Bulletin A27 so that further detailed description of these devices, per se, is considered to be unnecessary. In a general sense, however, the linear variable differential transformers referred to are used in pairs, one transformer of each pair functioning as a control transformer whereas the other of each pair is associated with the device controlled as a feedback transformer. Each of the linear variable differential transformers includes a core movable in a coil and may be associated with appropriate electronic circuitry so that a control signal is generated when the signal output of the feedback transformer corresponds precisely to the signal of the control transformer, the latter having been positioned either manually or mechanically by a programming device.

As shown in FIG. 24, a programming cam template 22' having a pair of axially offset peripheral cam surfaces 252 and 254 is substituted for the programming cam template 22 in the previously described embodiment. The peripheral cam surface 252 operates to program the respective angular positions to which the bending head 14 is moved during an automatic bending cycle. To effect this control, a cam follower 256 is provided on one arm 257 of a pivoted bell crank 258. The other arm 260 of the bell crank lever is slidably and pivotally connected to a rod 262 suitably supported from the machine frame 10 by a bracket 263 for reciprocal movement. A compression spring 264 biases the rod to the right as shown in FIG. 24, thereby to insure contact of the follower roll 256 at all times with the peripheral cam surface 252. The end of the rod 262 abuts the end of a plunger 265 directly connected to the core (not shown) of a linear variable differential transformer 266 of the type aforementioned.

As shown in FIGS. 25 and 26, the pinion 122 formed on the shaft extension 94 and described above with respect to FIG. 3b is in this instance engaged by a rack 267 slidably mounted in the housing 16 for reciprocation by hydraulic piston-cylinder motor 268. The end of the rack 267 projecting from the housing 16 opposite from the motor 268 is pivotally and slidably connected to a lever arm 270 pivotally suspended from a bracket 272 mounted on a linear bearing 274 in turn supported on the top of the housing 16. A rod 276, slidably received in the bearing 244, is also pivotally and slidably connected to the lever arm 270 and abuts at one end against a plunger 278 of another linear variable differential transformer 280.

The linear transformer 266 actuated by the cam follower 256 will therefore function as a control transformer whereas the linear transformer 280 will function as the feedback transformer in the conventional manner of using such devices as described above. As shown specifically in FIG. 25, both transformers 266 and 280 are connected electrically to a control servo X. Since the details of the control servo are conventional, further discussion thereof is unnecessary except to point out that the control servo X operates to convert the electrical signals developed by the linear transformers 266 and 280 to a hydraulic control for the hydraulic motor 268. Thus, it will be appreciated that the signal variation transmitted from the linear transformer 266 will operate the motor 268 to advance the rack 267 either to the left or to the right until the proper position of the rack is reached and indicated by the feedback linear transformer 280. At this point, the actuation of the motor 268 will terminate with the bending head 14 in the angular position to which the pinion 122 is moved by the rack 266.

The arrangement for controlling the arc through which the bending die 40 moves, or the single plane bend angle effected by the stroke of the bending head motor 88, in the embodiment of FIGS. 24–26, is similar to the control for the head angle described in the preceding paragraphs. In this instance, the peripheral cam surface 254 is engaged by a cam follower 282 mounted on a short arm 284 of a pivoted bell crank 286 as shown in FIG. 24. The other arm 288 of the bell crank 286 is connected to an axially slidable rod 290 supported in a bracket 292. The rod 290 will, therefore, be positioned by the bell crank 286 in accordance with the shape of the peripheral cam surface 254. Manual means 293 is provided by which the axial position of the rod 290 may be controlled by an operator in such a manner to override the control effected by the peripheral cam surface 254. The plunger 290 engages in abutting relation the end of a plunger 294 of a linear variable differential transformer 296.

As shown in FIG. 25, the bending head motor 88 is modified slightly such that piston rod thereof projects through the rear end of the motor as a threaded extension 298. An L-shaped bracket member 300, fixed to the threaded extension 298 is arranged to engage the plunger 302 of a feedback linear transformer 304. In view of the description given above with respect to the manner in which the linear transformers 266 and 280 control the operation of the motor 268, it will be apparent that the transformers 296 and 304 control the bending head motor 88 in almost identical fashion. In other words, the signal from the cam actuated transformer 296 is fed to a control servo Y to bring about operation of the motor 88 to advance the bending head quill 80 until the signal from the feedback transformer 304 matches that of the transformer 296. Hydraulic valve means in the control servo Y will operate to stop actuation of the motor at precisely the point desired to terminate movement of the bending die 40 after it has passed through an arc determinative of the desired angle of bend.

Since the single plane bending angle is thus established by the linear variable differential transformers 296 and 304, the limit switches LS3 and LS4 are not needed in the embodiment of FIGS. 24–26. Instead limit switches corresponding to LS1, LS2 and LS5 of the embodiment of FIGS. 1–16 are used. These limit switches are incorporated in appropriate circuit similar to that described with reference to FIGS. 15 and 16.

In view of the description given, it will be apparent to those skilled in the art that the bending machine of the present invention may take various specific forms other than those expressly described and illustrated herein. Accordingly, it is intended that the foregoing description is illustrative of preferred embodiments only, not limiting, and that the true spirit and scope of the present invention is to be determined by reference to the accompanying claims.

What is claimed is:

1. Apparatus for progressively forming a series of bends in linear stock material, each of the bends being located at axial positions along the length of said material, thereby establishing a product portion and a stock portion in said material, said apparatus comprising: bending means for displacing the product portion of said material in a radial plane relative to said stock portion to form a bend, means supporting said bending means for rotation about said material, means to advance said material longitudinally toward said bending means to establish said axial positions, means for rotating said bending means to establish the radial direction of bend at said axial positions, and cut off means for cutting said material after a predetermined number of bends.

2. The apparatus recited in claim 1 including means to control said last mentioned means to establish predetermined angular positions of said bending means about said stock portion at each of said axial positions, and means synchronizing said control means with said material advancing means.

3. The apparatus recited in claim 2 wherein said control means includes a rotatable programming member and driving means for rotating said member.

4. The apparatus recited in claim 3 wherein said synchronizing means includes a drive transmission connected between said material advancing means and said drive means.

5. The apparatus recited in claim 3 wherein said programming member is a replaceable cam template.

6. The apparatus recited in claim 3 wherein said programming member is a rotatable cam template and wherein said control means includes further, a cam follower in engagement with said template, said bending head rotating means being operated in accordance with movement of said cam follower.

7. The apparatus recited in claim 6 wherein said bending head rotating means includes mechanical force transmitting means connected directly between said bending head and said follower.

8. The apparatus recited in claim 3 including further control means to interrupt said driving means upon the establishment of said axial positions and prior to actuation of said bending means to form a bend.

9. The apparatus recited in claim 8 including means responsive to the formation of a bend to actuate said driving means after the interruption thereof.

10. The apparatus recited in claim 8 in which said further control means includes means to establish the angle of said bend in said radial plane.

11. The apparatus recited in claim 10 wherein said last-mentioned means includes multiple stop means for positively restricting the extent to which said bending means displaces said product portion.

12. The apparatus recited in claim 8 in which said further control means includes a plurality of signaling elements on said rotatable programming member, and means actuated by said elements to interrupt said driving means upon the establishment of said axial positions.

13. The apparatus recited in claim 12 wherein said means actuated by said elements includes means to actuate said bending means.

14. The apparatus recited in claim 12 wherein said means actuated by said elements includes a limit switch fixedly positioned relative to said programming member.

15. Apparatus for bending linear stock material comprising: a support; a spindle carried by said support and having one end projecting therefrom; a bending head supported on said one end of said spindle and rotatable about the axis of said spindle, said bending head including an anvil and bending die means movable between retracted and extended positions relative to said anvil to produce a single plane bend in said stock material, means to actuate said bending die means; means for rotating said head about the axis of said spindle to predetermined angular positions to establish a radial plane of bend, feed means to advance said stock material toward said bending head, cut off means to sever said stock material slightly in advance of said anvil, and control means to synchronize said head rotating means and said feed means, whereby said stock material is advanced to predetermined axial positions relative to said anvil and said bending head is rotated simultaneously with the advancement of said stock material to establish the radial plane of bend at each of said axial positions respectively.

16. The apparatus recited in claim 15 wherein said bending die actuating means includes a quill slidably mounted on said spindle, and means connected between said quill and said die means to move the latter relative to said anvil upon sliding movement of said quill on said spindle.

17. The apparatus recited in claim 16 wherein said quill is rotatable with said bending head and in which said bending die actuating means includes further, motor means mounted on said support and means operatively connecting said motor means and said quill.

18. The apparatus recited in claim 17 wherein said quill includes a radial flange and in which said means connecting said motor means and said quill includes a rod connected to said motor means and a pair of elements projecting from said rod, one on each side of said flange, to cause said quill to move axially with said rod while permitting rotation of said quill relative to said rod.

19. The apparatus recited in claim 17 including adjustable means to regulate the distance said quill is moved by said motor means, thereby to regulate the size of bend angle in said radial plane of bend.

20. The apparatus recited in claim 19 wherein said adjustable means comprises a plurality of stop members each having a different axial position relative to movement of said quill, and means carrying said stop members on said support movement individually into the path of said quill.

21. The apparatus recited in claim 15 including a pair of quills slidably mounted on said spindle, means connecting one of said quills to said cutoff means, means connecting the other of said quills to said bending die means, and power means for moving said quills individually on said spindle to actuate said cutoff means and said bending die means, respectively.

22. The apparatus recited in claim 21 wherein said power means includes a pair of independent linear motors mounted on said support one of said motors being drivably connected to said one quill and the other of said motors being drivably connected to said other quill.

23. The apparatus recited in claim 15 wherein said control means comprises rotatable programming means and programming and feed driving means to drive said programming means and said feed means concurrently.

24. The apparatus recited in claim 23 wherein said control means includes further, a peripheral camming surface on said programming means, cam follower means in engagement with said camming surface and operably connected to said means for rotating said head, signal elements carried by said programming means, and circuit means actuated by said signal elements to de-energize said programming and feed driving means at said axial positions and to energize said programming and feed driving means after movement of said bending die means to said extended position.

25. The apparatus recited in claim 24 wherein said circuit means includes means to disable said programming and feed drive means when said bending die is out of said retracted position.

26. The apparatus recited in claim 24 wherein said circuit means includes means to disable said bending die actuating means during operation of said programming and feed driving means.

27. The apparatus recited in claim 23 wherein said programming and feed drive means comprises an axle rotatably carried by said support, a motor for driving said axle, rotatable force transmitting means fixed to said axle for rotation therewith, and means drivably connecting said force transmitting means to said feed means.

28. The apparatus recited in claim 27 in which said programming means comprises a cam template removably secured to said axle for rotation therewith.

29. The apparatus recited in claim 28 including a series of angularly spaced pins on said template and arranged concentrically on the axis of said axle and wherein said control means includes further, switch means positioned on said support to be actuated by said pins to energize said bending die actuating means.

30. The apparatus recited in claim 20 including switch means to signal the extended position of said bending die means, and switch actuating means including a plunger carried by each of said stop members and movable relative thereto upon engagement of said stop members by said quill, and means connecting said switch means with the plunger carried by the one of said stop members positioned in the path of said quill.

31. The apparatus recited in claim 30 wherein said means connecting said switch means with the plunger comprises lever means pivotally mounted to position one end thereof for engagement by said plunger and the other end thereof to engage said switch means.

32. The apparatus recited in claim 20 wherein said means carrying said stop members comprises a rotatable shaft extending in parallel with said spindle, a disc member fixed on the end of said shaft, said stop members extending axially through said disc and being angularly spaced thereon, and means to rotate said shaft.

33. The apparatus recited in claim 32 wherein said means to rotate said shaft includes a pinion on said shaft and rack means engaging said pinion, said rack means being movable between pre-established positions corresponding to the positioning of said stop members respectively in the path of said quill.

34. The apparatus recited in claim 15 wherein said means for rotating said head about the axis of said spindle comprises a first pinion fixed on said spindle, and first rack in mesh with said first pinion and movable in accordance with said control means to rotate said spindle and said head, a second pinion on said spindle and second rack means in mesh with said second pinion, and means to bias said second rack means in a direction to yieldably oppose rotational movement of said spindle by said first rack means.

35. Apparatus for producing a plurality of bends in linear stock material comprising bending means for bending said material, means for advancing said material toward said bending means to establish a plurality of bending positions at spaced points along said material, means for producing realtive rotation between said bending means and material to establish the direction of bend at said bending positions, means for actuating said bending means to produce at said bending positions bends in the material in a direction determined by the relative rotational position between said bending means and material, cut off means for cutting said material after a predetermined number of bends, and control means to control automatically the movement of said material toward said bending means and the actuation of said bending means to bend said material at said bending position in accordance with a predetermined program for bending the material into an element having a predetermined configuration, said control means including means for producing said relative rotation between the bending means and material while said material is moving from one bending position to another.

36. Apparatus for producing a plurality of bends in linear stock material comprising bending means for bending said material, means for advancing said material toward said bending means to establish a plurality of bending stations at spaced points along said material, means for producing relative rotation between said bending means and material to establish the direction of bend at said bending stations, means for actuating said bending means to produce at said bending stations bends in the material in a direction determined by the relative rotational position between said bending means and material, cutoff means for cutting said material after a predetermined number of bends, control means to control automatically the advancing of said material to said bending means, the actuation of said bending means to bend said material and the actuation of said cutoff means, and program means for actuating said control means automatically through a plurality of cycles with each cycle comprising a predetermined number of bends and actuation of said cutoff means whereby said apparatus can produce automatically from a long length of said material a plurality of said elements having the same predetermined configuration.

References Cited

UNITED STATES PATENTS

| | | | |
|---|---|---|---|
| 2,382,745 | 8/1945 | Powers | 72—7 |
| 3,145,756 | 8/1964 | Hill | 72—7 |
| 3,373,587 | 3/1968 | Subbin et al. | 72—7 |

CHARLES W. LANHAM, Primary Examiner

LOWELL A. LARSON, Assistant Examiner

U.S. Cl. X.R.

72—7